Figure 1:
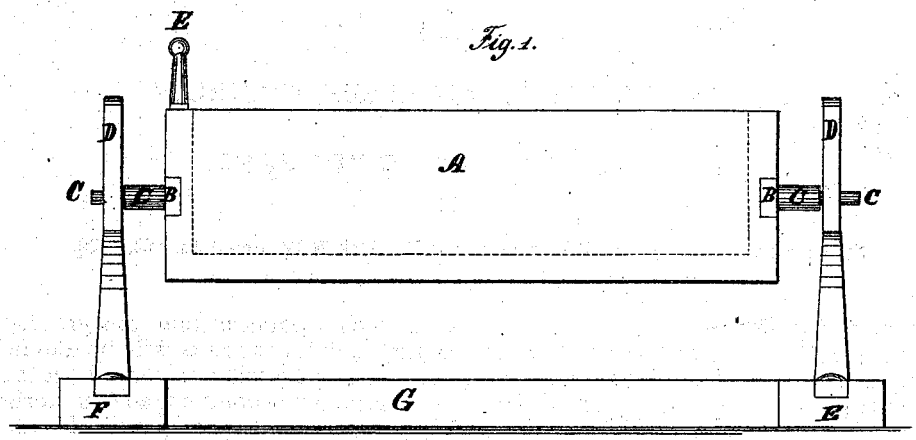
Figure 2:
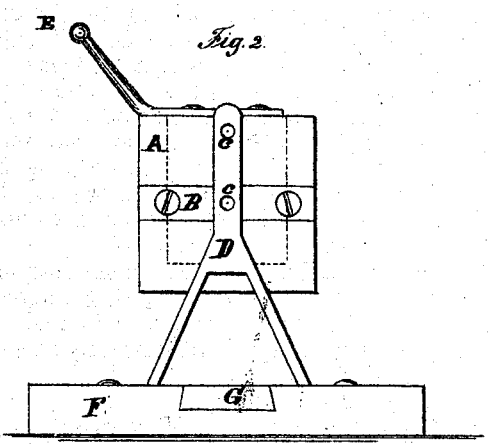

A. SIMKINS.

Improvement in Feed-Troughs.

No. 129,687.

Patented July 23, 1872.

WITNESSES:

INVENTOR:

Aaron Simkins,
By Wells W. Leggett,
Attorney.

UNITED STATES PATENT OFFICE.

AARON SIMKINS, OF ALGANSEE, MICHIGAN.

IMPROVEMENT IN FEED-TROUGHS.

Specification forming part of Letters Patent No. 129,687, dated July 23, 1872.

*To all whom it may concern:*

Be it known that I, AARON SIMKINS, of Algansee, county of Branch, State of Michigan, have invented a new and Improved Watering and Feed Trough; and I declare the following to be a full, clear, and exact description of the same, such as will enable others skilled in the art to which it pertains to make and use it, reference being had to the accompanying drawing which forms a part of this specification.

My invention relates to watering-troughs swung so as to be easily inverted for emptying or cleansing.

In the drawing is presented a plan in elevation of the watering-trough, and an end view in elevation, showing the swinging device, in which A is the trough. B is a plate of metal, provided with a pivot or support, C. D is an upright brace, having a pivot-hole, c, for the reception of C. F are cross-pieces, into which are dovetailed the two ends of the retaining-brace G.

My invention consists as follows: The washing and cleansing of a water or feed trough on a farm have always been a very difficult and laborious work, as also the emptying of a water-trough to prevent its freezing. I therefore propose to attach to the ends of a trough the plates B B, provided with gudgeons or pivots C, at such a point as that the gravity of the trough and its contents will be ample to prevent its turning when in use. I set these pivots C into pivot-holes c made in uprights D. These uprights may be provided with two or more holes each, in order to gage the height of the trough for different classes of stock. These uprights are attached firmly to cross-braces F F, which are provided with mortises, into which the dovetailed tenons on the ends of the longitudinal brace G are set, so that by varying the length of the brace G the same attachments may serve for a shorter or a longer trough. At one end of the trough, on top, I attach a handle, E, by which the trough may be capsized and its contents thrown out. This handle extends some distance beyond the edge of the trough, so that it may act as a lever to assist in tipping the trough.

Having thus fully described my invention, I claim—

The combination of water or feed trough A, plates B, gudgeons C, gageable uprights D, braces F G, and handle E, for the purposes substantially as set forth and shown.

AARON SIMKINS.

Witnesses:
C. D. WRIGHT,
D. THOMPSON.